Feb. 25, 1964 G. D. PRENTICE 3,122,128
CATTLE STALL YOKE MOUNTING
Filed May 23, 1962
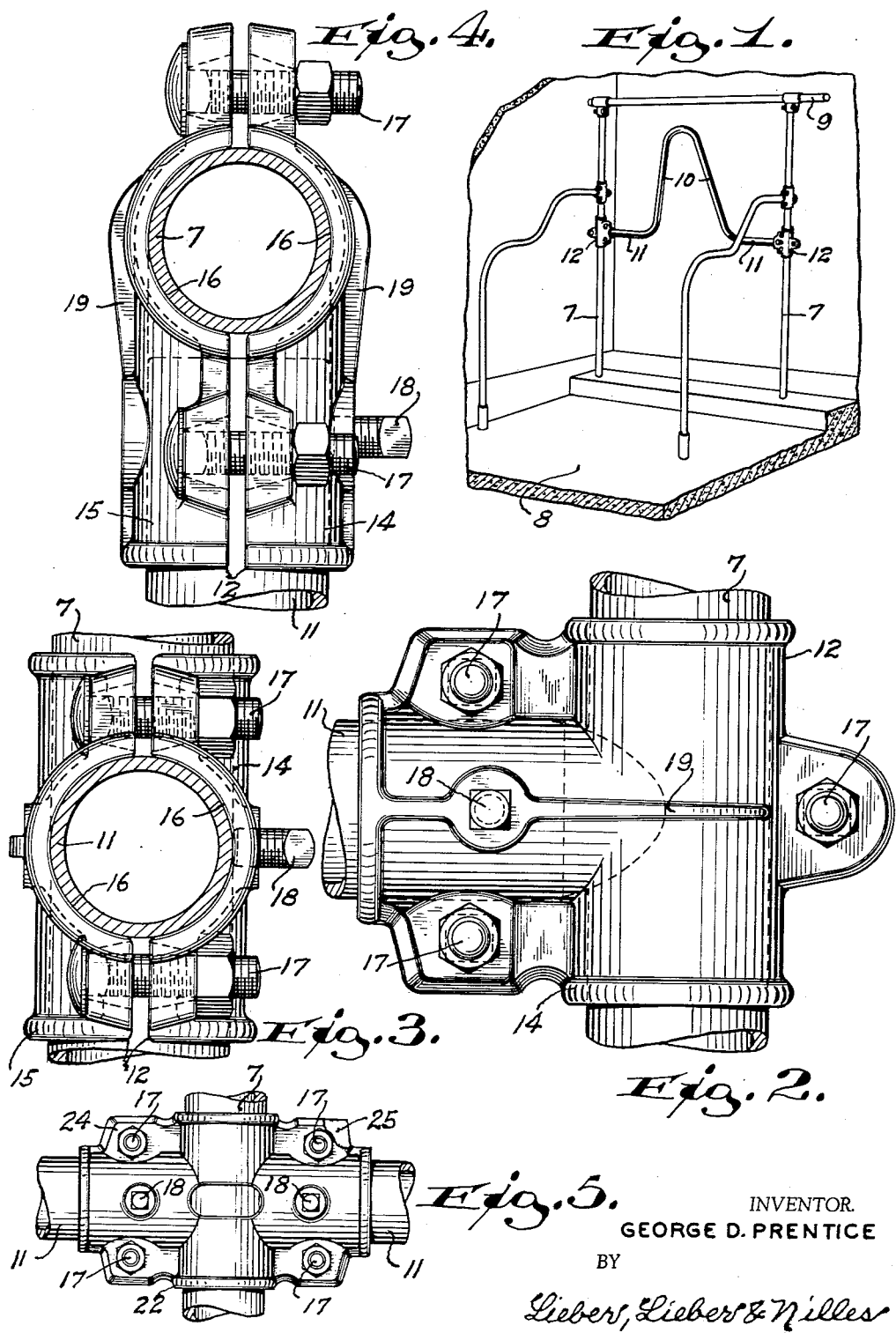
INVENTOR.
GEORGE D. PRENTICE
BY
Lieber, Lieber & Nilles
ATTORNEYS.

# United States Patent Office 3,122,128
Patented Feb. 25, 1964

3,122,128
CATTLE STALL YOKE MOUNTING
George D. Prentice, Milwaukee, Wis., assignor to A. F. Klinzing Co., Inc., Milwaukee, Wis., a corporation of Wisconsin
Filed May 23, 1962, Ser. No. 197,022
2 Claims. (Cl. 119—27)

The present invention relates in general to improvements in the art of enchancing the comfort of domestic animals, and it relates more specifically to improvements in the construction and operation of stalls for cattle or the like.

The primary object of the invention is to provide an improved cattle stall assemblage which is simple in construction and effective in use.

It has heretofore been proposed to provide an animal stall having an inverted V-shaped yoke pivotally suspended from supporting uprights anchored in the floor at the front of the stall, the yokes being adjustable in elevation and angularity relative to the uprights in order to accommodate beasts of different sizes. In this prior type of stall, the elevation and angularity of the yoke in each stall could only be adjusted simultaneously since both of these characteristics were controllable with the aid of common release and clamping devices, and this fact made it difficult to effect one type of adjustment without undesirably affecting the other.

It is therefore an important object of the present invention to provide an improved yoke mounting for the above-mentioned general type of animal stall, whereby either the elevation or the angularity of the yoke may be conveniently and accurately varied independently of each other, so that one setting is not necessarily affected by the other.

Another important object of this invention is to provide a simplified clamping device for holding the neck yoke of a cattle stall in various adjusted positions, and which can be readily manipulated for effecting yoke adjustment.

A further important object of the invention is to provide an improved U-shaped yoke and clamp assembly for animal stalls which can be produced and sold at moderate cost for application to different types of stalls to properly position the animals therein.

Still another important object of my invention is to provide a durable clamp composed of two similar cooperating sections adapted to firmly connect a yoke and a mounting post while permitting independent adjustment of the elevation and angularity of the yoke relative to the post.

These and other more specific objects and advantages of the invention will be apparent from the following description.

A clear conception of the features constituting the present improvement, and of the construction and operation of several yoke clamping devices embodying the invention, may be had by referring to the drawing accompanying and forming a part of this specification wherein like reference characters designate the same or similar parts in the various views.

FIG. 1 is a somewhat diagrammatic perspective view of a vacant single dual-post stall having an adjustable U-shaped animal neck engaging yoke suspended from spaced uprights at the front of the stall;

FIG. 2 is an enlarged side view of one of the improved clamping brackets cooperable with a single U-shaped cattle neck yoke and an adjacent post;

FIG. 3 is an end view of the clamping bracket shown in FIG. 2;

FIG. 4 is a top view of the same bracket shown in FIGS. 2 and 3; and

FIG. 5 is a somewhat reduced side view of a modified clamping bracket cooperable with a single intervening post and with a pair of neck yokes disposed in adjoining stalls.

While the invention has been shown and described as having been embodied in a stall especially of the cattle confining type, it is not intended to restrict its use to stalls for cattle; and it is also contemplated that specific descriptive terms employed herein be given the broadest possible interpretation consistent with the disclosure.

Referring to FIG. 1 of the drawing, the typical cattle stall shown therein comprises in general a pair of laterally spaced uprights or posts 7 fixedly secured at their lower ends in the floor 8 near the front ordinary manger portion of the stall and being interconnected at their upper ends by a cross brace 9 and near their lower portions by the usual tie-chain (not shown); a yoke spanning the space between the posts 7 beneath the brace 9 and having an inverted U-shaped medial portion 10 and integral oppositely directed pivot ends 11 disposed perpendicular relative to the adjacent posts; and an improved clamping device 12 adjustably connecting each of the yoke ends 11 with the adjacent post 7.

The posts 7, brace 9, and the yoke may be formed of durable metal tubing, and each of the clamping devices 12 specifically shown in FIGS. 1 to 4 inclusive comprises a pair of reversely disposed similar clamping sections 14, 15, each provided with semi-cylindrical recesses 16 facing each other; a series of three bolts 17 coacting with both of the clamping sections 14, 15 to force the recesses 16 thereof into clamping engagement with the intervening post 7; and a set screw 18 screw threaded in the section 14 and being cooperable with an inserted yoke pivot end 11 to lock the yoke in various angular positions relative to the posts 7. The two sections 14, 15 of the clamping device 12 may be formed of metal castings from the same pattern, but only one of these sections need be provided with a locking set screw 18. The longitudinal and transverse recesses 16 in the clamp sections 14, 15 are disposed perpendicular to each other so as to maintain the pivot end 11 of the yoke perpendicular to the adjacent post 7 when the clamping device 12 is in use, and each of the clamp sections may be reinforced by integral ribs 19.

When the various parts of the stall have been properly constructed as described, they may be assembled as shown in FIG. 1 and used as follows: After the posts 7 and the cross brace 9 have been installed, the bolts 17 should be removed from two of the clamping devices 12, and the sections 14, 15 of each clamp should be installed on one of the posts 7, and one end 11 of an intervening U-yoke should be inserted between the sections of each clamp, whereupon the bolts 17 may be loosely applied so as to permit the devices 12 to be bodily moved along the adjacent posts. The clamp and yoke assembly may then be positioned at the proper elevation to accommodate the animal which is to occupy the stall, whereupon the bolts may be tightened to firmly clamp the devices 12 upon the two posts 7. The U-shaped portion 10 of the yoke should then be swung about the common axis of its pivot ends 11 so as to properly angularly position the yoke for cooperation with the neck of the selected animal when standing in the stall, whereupon the set screws 18 may be manipulated to lock the pivots within the clamping devices 12, thus completing the assemblage.

The clamping devices 12 of FIGS. 1 to 4 inclusive may thus be utilized in stalls having independent posts 7, but in cases where adjoining stalls have a common post 7 disposed therebetween, a modified double clamping device 22 such as shown in FIG. 5 may be employed. This double clamp also comprises a pair of reversely disposed similar clamping sections 24, 25 each provided with semi-cylindrical recesses facing each other and cooperating to provide a pair of pivot sockets; a series of four bolts 17 coacting with both of the clamping sections 24, 25 to force the recesses thereof into clamping engagement with a common intervening post 7; and a pair of set screws 18 screw threaded in the section 24 and each coacting with one of the pivot sockets formed by the clamping sections. In this modification, each of the set screws 18 is independently cooperable with the pivot end 11 of a U-shaped neck yoke disposed in each of the adjoining stalls to lock these yokes in the desired angular positions relative to the common post 7, while the bolts 17 serve to clamp the device 22 upon this post at the desired elevation.

It should be noted that each of the embodiments of the invention illustrated permits the angularity of the yoke relative to its supporting posts or uprights to be varied independently of its adjustment in elevation. The bolts 17 serve only to clamp the sections of each clamping unit against the adjacent post without clamping the pivot end 11, and the set screws 18 function independently of the bolts 17 to lock the yoke in the desired angular position. The simple but durable clamping devices 12, 22 may be manufactured at moderate cost because of the similarity of their respective sections 14, 15 and 24, 25, and these devices may be installed by a novice and have proven highly satisfactory and successful in actual use.

Various modes of carrying out the invention are contemplated as being within the scope of the following claims particularly pointing out and distinctly claiming the subject matter which is regarded as the invention:

1. An animal stall comprising, a pair of laterally spaced fixed uprights defining one end of the stall, an inverted U-shaped yoke positioned between said uprights and having opposite ends thereof extending outwardly therefrom into proximity with said uprights, a bracket means secured to at least one of said uprights for vertical adjustment therealong, said bracket means being comprised of a pair of similar sections having mating grooves cooperating to provide an open socket laterally extending from said upright and pivotally receiving one end of said yoke, and set screw means extending through one of said bracket sections and into said socket for direct coaction with said yoke end for securing the yoke in any desired position of angular adjustment relative to said uprights independent of said vertical adjustment.

2. An animal stall according to claim 1, wherein each of the uprights is provided with a similar bracket means whereby both ends of the yoke are pivotally retained for angular adjustment of said yoke.

References Cited in the file of this patent
UNITED STATES PATENTS

| | | |
|---|---|---|
| 1,253,494 | James | Jan. 15, 1918 |
| 1,611,935 | Mitchell | Dec. 28, 1926 |
| 1,692,470 | Sederberg | Nov. 20, 1928 |
| 2,037,980 | Heartz | Apr. 21, 1936 |
| 2,593,597 | Palmer | Apr. 22, 1952 |
| 2,779,312 | Girton | Jan. 29, 1957 |